(12) United States Patent
Holm

(10) Patent No.: US 10,151,415 B1
(45) Date of Patent: Dec. 11, 2018

(54) APPARATUS AND METHOD FOR MAKING CUSTOM LENGTH PIPE NIPPLE

(71) Applicant: Chris Lansing Holm, Pacific Palisades, CA (US)

(72) Inventor: Chris Lansing Holm, Pacific Palisades, CA (US)

( * ) Notice: Subject to any disclaimer, the term of this patent is extended or adjusted under 35 U.S.C. 154(b) by 156 days.

(21) Appl. No.: 14/822,205

(22) Filed: Aug. 10, 2015

Related U.S. Application Data (60) Provisional application No. 61/999,969, filed on Aug. 11, 2014.

(51) Int. Cl.
*F16L 55/00* (2006.01)
*G01B 5/02* (2006.01)
*B23K 1/00* (2006.01)

(52) U.S. Cl.
CPC ............ *F16L 55/00* (2013.01); *B23K 1/0008* (2013.01); *G01B 5/02* (2013.01)

(58) Field of Classification Search
CPC .......... F16L 55/00; G01B 5/02; B23K 1/0008
See application file for complete search history.

(56) References Cited

U.S. PATENT DOCUMENTS

| | | | | |
|---|---|---|---|---|
| 1,830,116 | A * | 11/1931 | Kruft | G01F 23/0046 33/713 |
| 2,917,832 | A * | 12/1959 | Calmenson | G01F 23/04 33/730 |
| 3,015,892 | A * | 1/1962 | Stuart | G01B 3/30 33/542 |
| 3,308,545 | A * | 3/1967 | Freimark | G01B 5/143 33/520 |
| 3,349,944 | A * | 10/1967 | Moeller | G01F 23/04 184/109 |
| 4,033,043 | A * | 7/1977 | Cunningham | A61B 5/1076 33/542 |
| 4,416,309 | A * | 11/1983 | Salim | F16L 1/11 138/104 |

(Continued)

OTHER PUBLICATIONS eBay auction page, "1971 Moto Guzzi Ambassador 750 Oil Dipstick" 2017.*

*Primary Examiner* — John Fitzgerald (57) ABSTRACT

An apparatus to make a custom length pipe nipple, and method for use of the apparatus. The apparatus has a male plumbing thread at one end connected to an elongate member, with length or measurement markings along the elongate member. The apparatus is threaded into a plumbing fixture that will be flush mounted against a wall, and then using the markings on the elongate member, a length is determined that corresponds to the flush mounting surface of the plumbing fixture. The apparatus is then threaded into a plumbing fitting, such as a drop ear elbow inside a wall, and a second length is determined that corresponds to a flush mounting surface of the wall. The two lengths are added together to determine the length of a piece of pipe. Tightening and/or caulk allowance may be included, and a piece of copper or iron pipe is then cut to length. For copper pipe, a threaded male copper fitting is solder attached to each end. For iron pipe, the ends are threaded. Depending on whether copper or iron pipe is used, there are different length or measurement markings along the elongate member.

12 Claims, 8 Drawing Sheets

(56) References Cited

U.S. PATENT DOCUMENTS

| | | | | |
|---|---|---|---|---|
| 4,701,869 A * | 10/1987 | Callegari, Sr. | G01B 11/02 | 702/158 |
| 4,892,449 A * | 1/1990 | Croxton | B25B 31/005 | 269/48.3 |
| 5,661,888 A * | 9/1997 | Hanslik | B23P 19/10 | 29/407.02 |
| 6,550,156 B1 * | 4/2003 | Scoville | F16L 55/18 | 33/371 |
| 6,732,445 B1 * | 5/2004 | Scoville | F16L 55/18 | 33/371 |
| 7,131,213 B2 * | 11/2006 | Dougherty | G01F 23/04 | 33/722 |
| 7,418,788 B1 * | 9/2008 | Herr | G01F 23/04 | 33/722 |
| D579,358 S * | 10/2008 | Memetaj | D10/71 | |
| 7,509,753 B2 * | 3/2009 | Nicosia | G01F 23/04 | 33/716 |
| 7,694,427 B2 * | 4/2010 | Long | G01B 3/34 | 33/520 |
| 7,707,737 B2 * | 5/2010 | Lightfoot | G01B 3/08 | 33/700 |
| 8,220,176 B2 * | 7/2012 | Loisel | F16B 1/0071 | 33/542 |
| 2008/0229602 A1 * | 9/2008 | Herr | G01F 23/04 | 33/722 |
| 2009/0015004 A1 * | 1/2009 | Long | G01B 3/34 | 285/39 |
| 2009/0308476 A1 * | 12/2009 | DeMartino | F16L 9/12 | 138/104 |
| 2011/0104418 A1 * | 5/2011 | Fish | G01B 3/004 | 428/36.9 |
| 2013/0125407 A1 * | 5/2013 | Shapiro | G01B 3/04 | 33/485 |

* cited by examiner

APPARATUS AND METHOD FOR MAKING CUSTOM LENGTH PIPE NIPPLE

This application claims priority to U.S. Provisional Patent Application Ser. No. 61/999,969, entitled Apparatus and Method for Making Custom Length Pipe Nipple, filed Aug. 11, 2014, the entire disclosure of which is incorporated herein by reference.

BACKGROUND

Plumbing, such as used for water supply, requires piping to connect fittings and fixtures. One particular challenge occurs when a supply connects through a finished wall to a plumbing fixture, such as in a bath tub or shower. In this case, it is desirable to have the fixture close or flush with the finished wall. However, where threaded fittings are used to connect the fixture, this type of close tolerance flush connection is difficult, especially when trying to accomplish with standard size pipe nipples. Even making a custom length pipe nipple can present a challenge because finding the required length is not easily measured. An apparatus is needed that will allow more precise measurement of a custom length nipple.

Further, custom threaded pipe nipple requires a threading machine and in most cases, use of a nipple chuck with the threading machine. This is a large piece of equipment, and may not be available at the job site. By contrast, a torch, flux and solder are almost always available and easily transported. An apparatus is needed that will allow use of standard copper pipe soldered to standard fittings to make a custom length nipple.

The preceding description is not to be construed as an admission that any of the description is prior art relative to the present invention.

SUMMARY OF THE INVENTION

In various aspects, the apparatus and method support the making of custom length pipe nipple. The apparatus comprises an elongate member that has a first end and a second end. On the first end of the elongate member, there is a plumbing pipe thread. Along the elongate member, there are length markings between the first end and the second end. The length markings are used to determine a length of pipe that will be used to create a custom pipe nipple.

In another aspect, the apparatus further comprises a handle on the second end of the elongate member. In another aspect, the apparatus further comprises a hole through the second end of the elongate member, which allows passage of a screwdriver and use of the screwdriver as a handle. In another aspect, there is a second plumbing pipe thread on the second end of the elongate member. In another aspect, there are two sets of length markings on the elongate member. One set of length markings begins near the first end, and another set of length markings begins near the second end. The length markings that begin near the first end indicate a length that is measured from an end of the first plumbing pipe thread. The length markings that begin near the second end indicate a length that is measured from where a shoulder would occur in a threaded copper fitting.

In another aspect, the length markings indicate a length measured in inches and fractions of an inch. In another aspect, the length markings indicate a length measured in millimeters. In another aspect, the plumbing pipe thread on the first end is ½ inch male national pipe thread. In another aspect, the maximum diameter of the elongate member is substantially the same as the diameter of standard ½ inch iron plumbing pipe. In another aspect, there are more than one set of markings spaced around a circumference of the elongate member. In another aspect, there are at least two sets of markings spaced around a circumference of the elongate member, where one set of markings indicates a length measured in inches and fractions of an inch, while another set of markings indicates a length measured in millimeters.

In methods for use of the apparatus, the plumbing pipe thread on one end of the apparatus is screwed into a threaded connection of a plumbing fixture. Using the measurement markings on the elongate member, a first length is determined that corresponds to a length between the threaded connection of the plumbing fixture and a mounting surface of the plumbing fixture. Then the plumbing pipe thread on one end of the apparatus is screwed into a threaded plumbing connection located in a wall. Using the measurement markings on the elongate member, a second length is determined that corresponds to a length between the threaded plumbing connection located in the wall and a mounting surface of the wall. The first length and second length are added together to determine a cut length.

In another aspect, a tightening allowance is included to determine the cut length. In another aspect, a piece of copper pipe is cut to match the cut length, and male thread couplings are soldered to each end of the copper pipe. In another aspect, a piece of iron pipe is cut to the cut length. In another aspect, a caulk allowance is added to the cut length, and a piece of iron pipe is cut to match the cut length plus caulk allowance.

The foregoing specific aspects are illustrative of those which can be achieved and are not intended to be exhaustive or limiting of the possible advantages that can be realized. Thus, the objects and advantages will be apparent from the description herein or can be learned from practicing the invention, both as embodied herein or as modified in view of any variations which may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

There are a number of instances where a water supply that is routed inside a wall cavity must exit the wall cavity through a hole in a finished wall surface and terminate in a plumbing fixture that is mounted flush or very nearly flush with the finish wall. Examples would include tub fill spouts and supply elbows that connect to a flexible hose for a hand-held shower spray head. If the plumbing fixture is not flush or nearly flush with the finish wall, there will be a gap between the fixture and the finish wall that is unsightly, difficult to fill with caulking, and prone to leaks that will allow water to enter the wall, causing damage.

In many instances, the plumbing fixture connection is a standard plumbing pipe thread, which in the United States is usually ½ inch national pipe thread (NPT). Similarly, it is common to use the same type and size of standard plumbing pipe thread on the fitting that is inside the wall. These fittings in the wall are sometimes call drop ear elbows.

Figure 1:
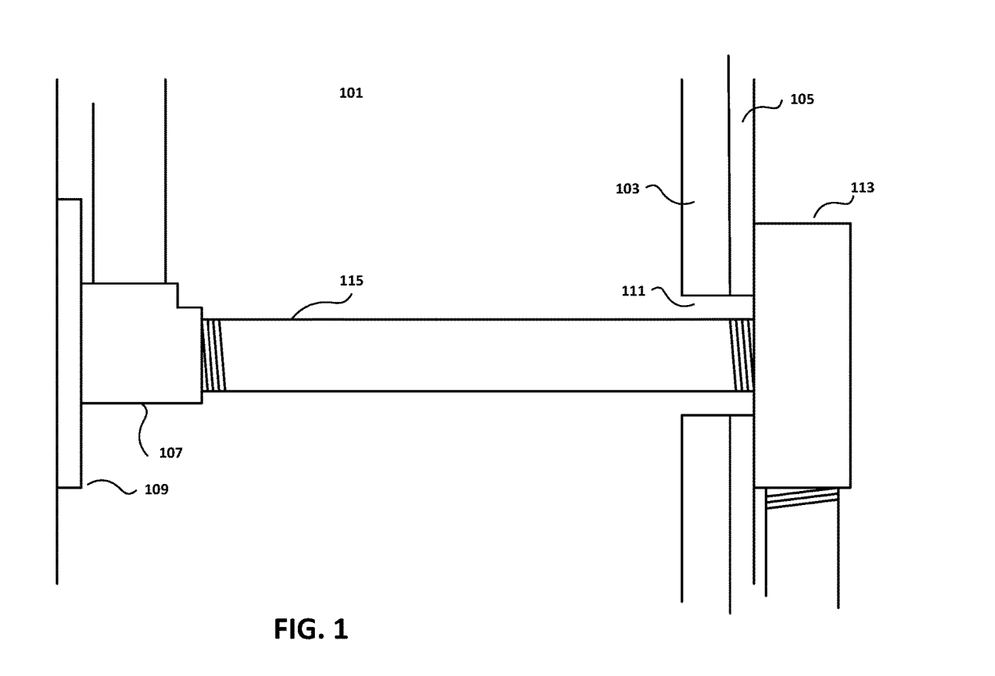
FIG. 1 illustrates plumbing connections relevant to embodiments of the instant invention.

FIG. 1 illustrates this type of common configuration. A wall cavity (101), which is often framed with 2×4 or 2×6 dimensional lumber provides a space to route a plumbing supply line. In a bathroom, the finish wall may include cement backer board, or a mortar bed (103), with an overlayer of tile or stone (105) on the outer most surface. Where the water supply line must exit the wall cavity through a hole in the finished wall, it is common to securely attach a drop ear elbow (107) to blocking material (109). This way, the water supply is firmly anchored inside the wall cavity and it will not move easily if it is pulled or pushed. If the water supply is copper pipe, it is common to attach a brass or bronze drop ear elbow to the copper pipe using a solder joint.

In most instances, plumbing inside the wall cavity is completed before the finish wall is installed. This means that after the finish wall is installed, the drop ear elbow is fixed in position and it can not be easily adjusted. In addition, the finish wall thickness depends on the materials used in the finish wall. Where a mortar bed is used under a layer of tile, the thickness of the mortar bed is not standard. The tile or stone thickness will also vary, and there is usually some sort of thinset or adhesive used between the mortar bed and tile. All of this means that the thickness of the finish wall is seldom known until completed. Once completed, the only access to the drop ear elbow is through a small hole (111) in the finish wall. Moving the drop ear elbow in or out is really no longer an option.

On the bath side of the finish wall, there is a plumbing fixture that connects to the water supply. The plumbing fixture might be a bathtub fill spout, or a supply elbow. In FIG. 1, plumbing fixture (113) is illustrated as a supply elbow. It is very important to prevent water from entering the wall cavity, because it is very difficult to know there is a leak until significant water damage has already occurred. For this reason, extra attention is paid to making sure that gaps are filled with caulking or some other water barrier, especially on the side of a shower where the shower head is installed and lots of water runs down the wall. That is also the same side of a shower where a tub fill spout or supply elbow is often installed. Caulking is most effective when it must only fill a small gap, it also looks better when it fills only a small gap.

The connection between the drop ear elbow (107) and the plumbing fixture (113) is usually made with a nipple (115), which is a short piece of plumbing pipe with male threads on each end. Although some pipe nipples for water supply are made of galvanized iron pipe, it is more common to use a brass nipple for this type of connection, particularly where the drop ear elbow is brass or bronze and connects to copper pipe. Brass has an advantage of not corroding or rusting like galvanized iron pipe.

Pipe nipples are generally made and sold in standard lengths. For ½ NPT, there is a close nipple, which is about 1⅛ inches from end to end. Then there is a shoulder nipple that is about 1¼ inches from end to end. Between 1½ inches and 6 inches, pre-manufactured nipples are available in ½ inch increments. Longer than 6 inches, pre-manufactured nipples are available in 1 inch increments.

Because pre-manufactured pipe nipples are only available in certain lengths, if the length needed is not almost the same as the standard length available, there will be either a large gap between the finish wall and the plumbing fixture, or not enough thread engaged to ensure a water-tight connection. To accommodate this problem, plumbers may start with a nipple that is just a bit too short, and wrap the male fitting with extra Teflon® tape and/or pipe joint compound to prevent leaks. Or, they may connect multiple shorter couplings with the goal of getting closer to the needed length. Neither solution is ideal.

It is possible to make a custom nipple of almost any length out of brass or iron pipe. However, threading pipe and in particular making a pipe nipple requires specialized tools. Further, making a custom length nipple with a pipe threading machine, especially a short nipple, will almost always require a nipple chuck, which may not be available at the job site.

It is possible to make a nipple of almost any length greater than about 2 inches by soldering standard threaded male copper fittings on each end of a piece of copper pipe. Determining exactly how long that piece of copper pipe should be is a challenge. The instant invention helps to solve that challenge.

Figure 2:
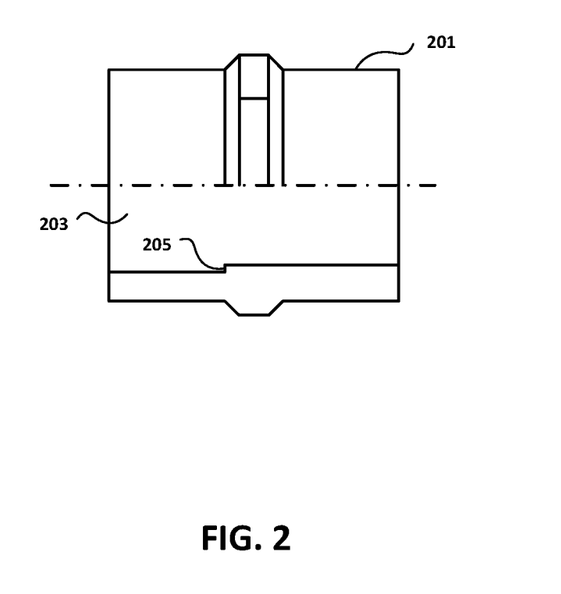
FIG. 2 illustrates plumbing fittings relevant to embodiments of the instant invention.

As illustrated in FIG. 2, male copper fittings have a threaded portion (201) and a socket (203) that receives a copper pipe. There is a shoulder (205) at the bottom of the socket, and the end of the copper pipe will touch that shoulder when it is fully inserted into the fitting. When the fitting and copper pipe is properly soldered, the resulting joint is water tight, and it has significant mechanical strength.

The dimensions of ½ inch NPT are standardized. So, any ½ inch NPT male copper fitting that is manufactured according to that standard should engage a ½ inch NPT female fitting with substantially the same number of threads. In addition, examination of fittings from multiple manufactures indicates that the socket depth and relationship of the socket to the threads is substantially the same for most ½ inch NPT male copper fittings, regardless of manufacturer. The instant invention takes advantage of these standard dimensions.

Figure 3:
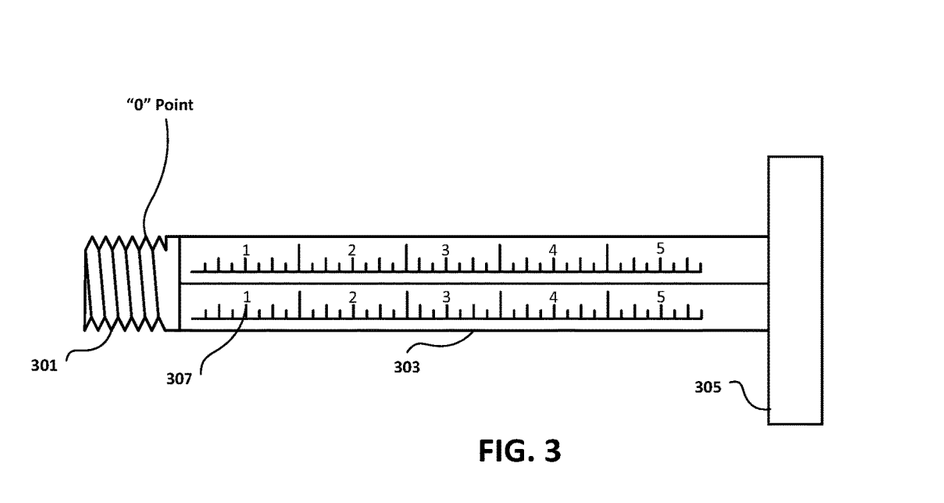
FIG. 3 illustrates embodiments of the instant invention.

As illustrated in FIG. 3, one embodiment of the instant invention has a ½ inch NPT male thread (301) at one end, and a handle (305) at the other end. An elongate member (303) connects the male thread end (301) to handle end (305). There are markings (307) on the elongate member that indicate a length. The length markings begin on the end with the male threads (301), and increase until they stop near the end with the handle (305). The length markings reflect the distance from where a shoulder will occur in a ½ NPT male copper fitting. The "0" point for this embodiment is illustrated.

Figure 8A:
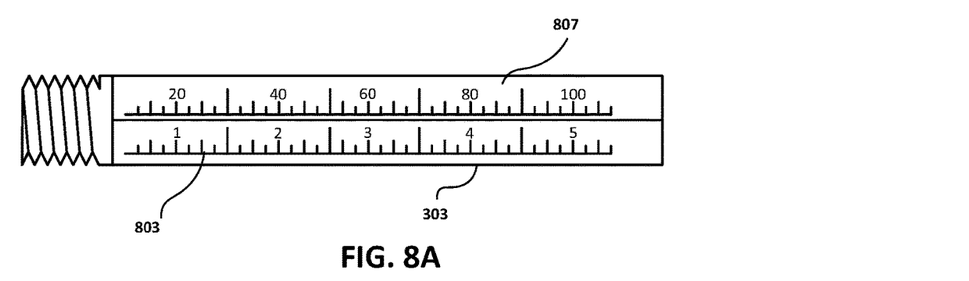
FIGS. 8A and 8B illustrate embodiments of the instant invention.

In one embodiment, the length markings are measured in inches and fractions of an inch. In another embodiment, the length markings are measured in millimeters. In another embodiment, there are multiple instances of the length markings, spaced around a circumference of the elongate member (303). In another embodiment illustrated in FIG.

8A, there are both inch (803) and millimeter (807) markings, spaced around a circumference of the elongate member (303).

In another embodiment, instead of a handle (305) there is a hole through elongate member 303 that allows a screwdriver or other object to be inserted and used as a handle to turn and tighten the elongate member into a plumbing fitting or fixture.

Figure 4:
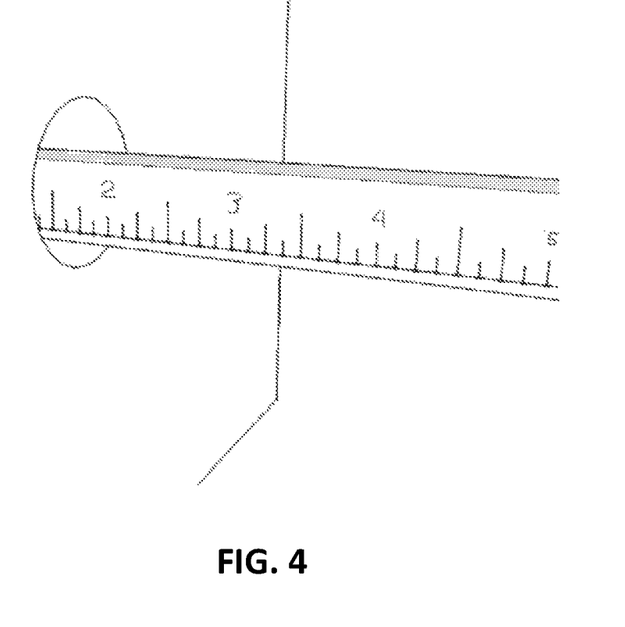
FIG. 4 illustrates embodiments of the instant invention.

In use, the threaded end (301) is engaged with female threads in a fitting that is inside the wall cavity. That fitting in the wall cavity might be a drop ear elbow. Using handle 305, the device is hand-tightened until the threads have made good contact, but it is not over-tightened such as a typical pipe fitting would be tightened to create a water-tight connection. Then, the length marking on elongate member (303) is determined that best corresponds to a flush surface of the finished wall. We can refer to this as a first length. This is illustrated in FIG. 4.

Figure 5:
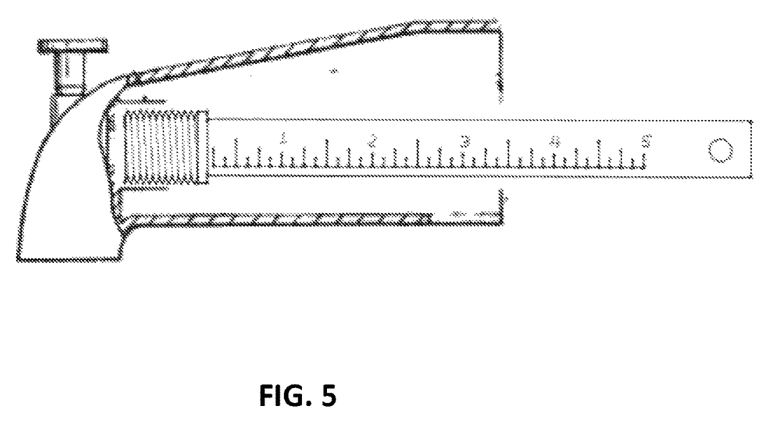
FIG. 5 illustrates embodiments of the instant invention.

The threaded end of the device is disengaged from the fitting inside the wall cavity, and it is engaged with female threads in the plumbing fixture that will be connected to the water supply. Once again, using handle 305, the device is hand-tightened until the threads have made good contact. And as before, a length marking is determined that best corresponds to a flush surface of the plumbing fixture. We can refer to this as a second length. See FIG. 5.

An exact length for the copper pipe is determined by adding the first length and second length together. However, this exact length does not include any allowance for tightening, so a tightening allowance may be added to the exact length. Depending on the plumber's preference, the tightening allowance may be something between one and two turns. ½ inch NPT has 14 threads per inch, and 1 or 2 turns of ½ inch NPT is between about 3/32 and 5/32 inches (or between about 1 and 4 mm). Balanced with an increase in length from a tightening allowance is a potential decrease in length from using tape or joint compound to seal the joint. In most applications, these connections are never highly pressurized, so between 0 inches and about ⅛ inch or 3 mm of tightening allowance may be sufficient.

It may also be desirable to have a small gap of about 1/16 to ⅛ inch between the plumbing fixture and the finished wall, for a caulk joint. If so, a caulk allowance is also added to the calculated length.

Using the calculated length, a piece of copper pipe is then cut and male copper thread fittings are soldered to each end. The custom length pipe nipple is then installed according to standard practice, using joint compound and/or tape, and after tightening, the plumbing fixture should be the desired distance from the finished wall.

Figure 6:
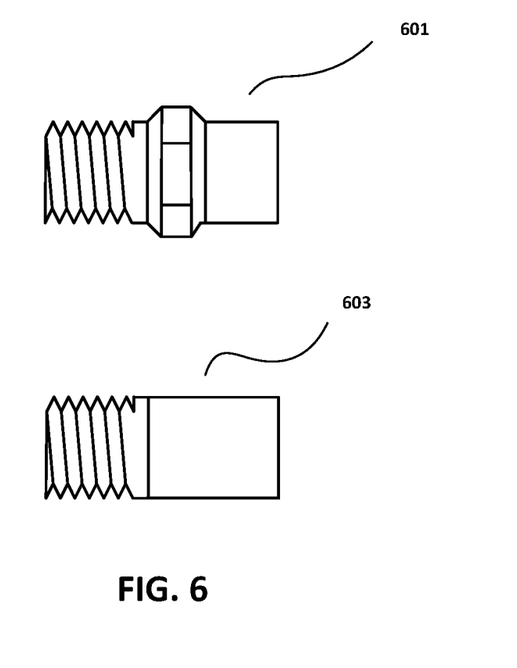
FIG. 6 illustrates embodiments of the instant invention.

For most plumbing fixtures, a standard male copper thread fitting will work without any problem. However, standard male copper thread fittings have hex flats so the fitting can be turned and tightened with a wrench. (See 601 in FIG. 6). For some plumbing fixtures the additional diameter associated with the hex flats on the fitting will interfere with the fixture. For those plumbing fixtures, it is necessary to use a male copper thread fitting that does not have hex flats, and has an outside diameter no greater than the outside diameter of standard ½ inch NPT pipe (about 0.840 inches). Such a modified male copper thread fitting is illustrated as 603 in FIG. 6.

Figure 7:
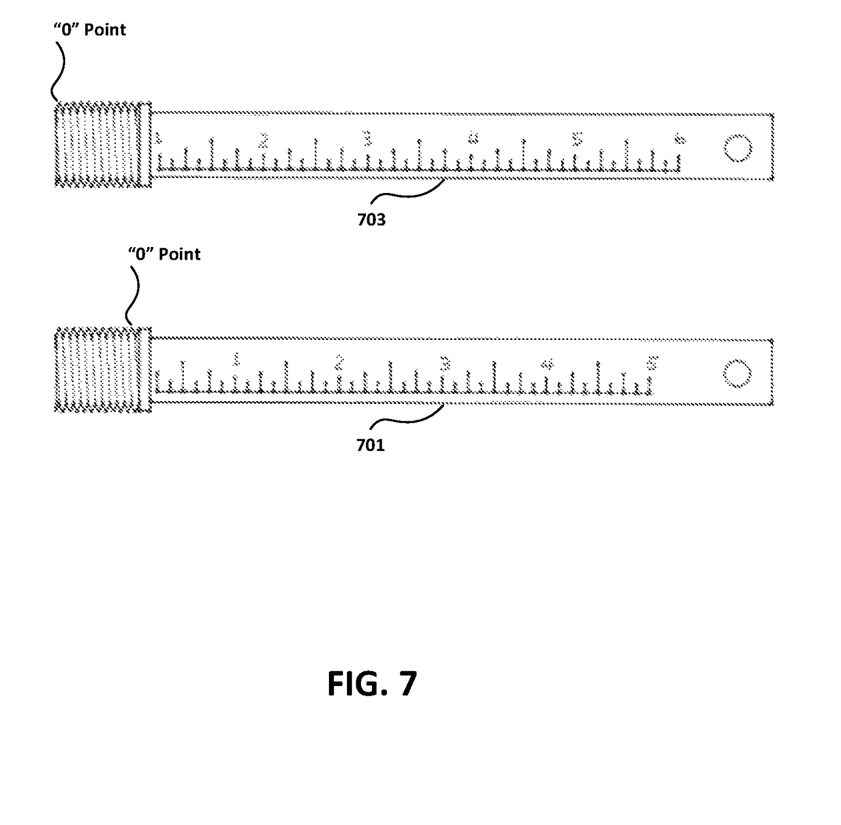
FIG. 7 illustrates embodiments of the instant invention.

In the embodiments described above, it has been assumed that copper pipe and copper thread fittings soldered to the copper pipe are used to make the custom length pipe nipple. In these embodiments, the "0" point of the apparatus corresponds to where a shoulder occurs in a threaded male copper fitting. (See apparatus 701 in FIG. 7). It is also possible to use a similar apparatus to determine the length of a custom nipple that is threaded from iron or brass pipe. In this embodiment, as illustrated by apparatus 703 in FIG. 7, the "0" point corresponds to the end of the plumbing pipe thread.

Figure 8B:
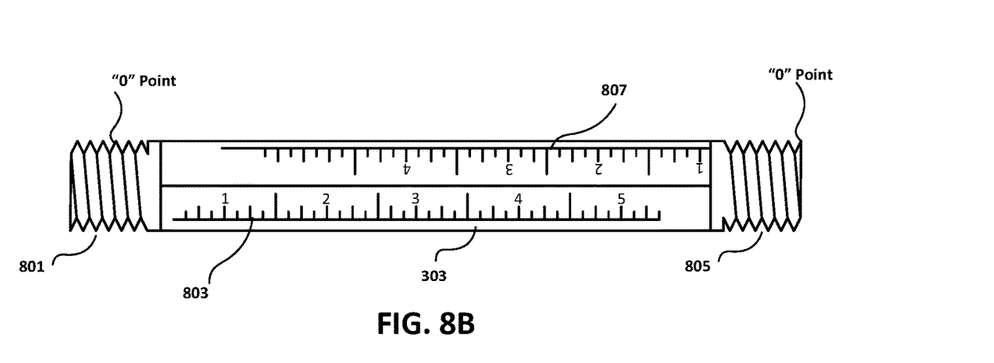

FIG. 8B illustrates an embodiment with a first plumbing pipe thread (805) on a first end and a second plumbing pipe thread (801) on a second end, with length markings (807) that begin near the first end and indicate a length measured from an end of the first plumbing pipe thread (805), and length markings (803) that begin near the second end and indicate a length measured from the point where a copper pipe shoulder would occur in a threaded copper fitting.

Although illustrative embodiments have been described herein in detail, it should be noted and will be appreciated by those skilled in the art that numerous variations may be made within the scope of this invention without departing from the principle of this invention and without sacrificing its chief advantages. For example features that appear in one embodiment of a particular figure are also applicable to embodiments that are illustrated in other figures.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

The invention claimed is:

1. An apparatus for use in making a custom length soldered copper pipe nipple comprising:
   an elongate member with a first end and a second end;
   a first plumbing pipe thread on the first end of the elongate member;
   first length markings on the elongate member increasing from the first end toward the second end, a zero point on the first length markings spaced a first distance from the first end, the first distance the same as a distance between a threaded end of a threaded copper fitting and a shoulder in the threaded copper fitting, the apparatus used in making a custom length soldered copper pipe nipple.

2. An apparatus according to claim 1, further comprising a handle on the second end of the elongate member.

3. An apparatus according to claim 1, further comprising a hole through the elongate member configured to allow passage of a screwdriver for use as a handle.

4. An apparatus according to claim 1, wherein the first length markings are measured in inches and fractions of an inch.

5. An apparatus according to claim 1, wherein the first length markings are measured in millimeters.

6. An apparatus according to claim 1, wherein the first plumbing pipe thread is ½ inch male national pipe thread.

7. An apparatus according to claim 1, wherein a maximum diameter of the elongate member is substantially the same as the diameter of standard ½ inch iron plumbing pipe.

8. An apparatus according to claim 1, further comprising a second length marking spaced from the first length marking on the elongate member.

9. An apparatus according to claim 1, further comprising at least a second length marking on the elongate member spaced from the first length marking on the elongate member, wherein the first length marking is measured in inches and fractions of an inch, and the second length marking is measured in millimeters.

10. An apparatus according to claim 1, further comprising a second plumbing pipe thread on the second end of the elongate member.

11. An apparatus according to claim 10, further comprising second length markings on the elongate member increasing from the second end toward the first end, the second length markings corresponding to an end of the second plumbing pipe thread.

12. An apparatus for use in making a custom length soldered copper pipe nipple comprising:
   an elongate member with a first end and a second end;
   a ½ inch male national pipe thread on the first end of the elongate member;
   a hole through the elongate member, wherein the hole is configured to allow a screwdriver to pass through and serve as a handle;
   a plurality of length markings that are measured in inches and fractions of an inch increasing from the first end toward the second end, the length markings spaced around a circumference of the elongate member, a zero point on the length markings spaced a first distance from the first end, the first distance the same as a distance between a threaded end of a threaded copper fitting and a shoulder in the threaded copper fitting, the length markings indicating a length of a copper pipe needed to make a custom length soldered copper pipe nipple.

\* \* \* \* \*